(12) United States Patent
Chen et al.

(10) Patent No.: US 7,221,439 B2
(45) Date of Patent: May 22, 2007

(54) METHOD OF ESTIMATING AND MEASURING LONGITUDINAL DISPERSION IN OPTICAL FIBERS

(75) Inventors: Xin Chen, Corning, NY (US); Charles F. Laing, Wilmington, NC (US); Ming-Jun Li, Horseheads, NY (US); Sonya M. Raney, Wrightsville Beach, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/118,302

(22) Filed: Apr. 29, 2005

(65) Prior Publication Data

US 2006/0244949 A1    Nov. 2, 2006

(51) Int. Cl.
*G01N 21/00* (2006.01)
(52) U.S. Cl. ..................................... 356/73.1
(58) Field of Classification Search ............. None
See application file for complete search history.

(56) References Cited

U.S. PATENT DOCUMENTS

| | | | |
|---|---|---|---|
| 5,619,320 A | | 4/1997 | Eiselt et al. |
| 5,724,126 A | * | 3/1998 | Nishi et al. ............... 356/73.1 |
| 5,956,131 A | * | 9/1999 | Mamyshev et al. ........ 356/73.1 |
| 6,067,149 A | | 5/2000 | Gripp et al. |
| 6,118,523 A | | 9/2000 | Brener et al. |
| 7,043,099 B1 | * | 5/2006 | Watanabe ................... 385/11 |

OTHER PUBLICATIONS

Yoshiyuki Suwtsugu, Takatoshi Kato, Toshiaki Okuno, Masayuki Nishimura—Measurement of Zero-Dispersion Wavelength Variation in Concatenated Dispersion-Shifted Fibers by Improved Four-Wave-Mixing Technique—IEEE Photonics Technology Letters, vol. 7, No. 12, Dec. 1995, pp. 1459-1461.

S. Nishi & M. Saruwatari—Technique for Measuring the Distributed Zero Dispersion Wavelength of Optical Fibres Using Idler Pulse Generation Caused By Modulation Instability—Electronic Letters—Mar. 14, 1996, vol. 32, No. 6.

K. Nakajima, M. Ohashi, K. Tsujikawa, M. Kato, K. Tajima, Y. Miyajima—Longitudinal Dispersion Evaluation In A 120km Long Installed Submarine Cable using A Bi-directional OTDR Technique—Electronic Letters IEE Nov. 12, 1998, 1997.

M. Ohashi & M. Tateda—Noval Technique for Measuring Longitudinal Chromatic Dispersion Distribution in Singlemode Fibres—Electronics Letters—Mar. 4, 1993, vol. 29, No. 5.

Michael Eiselt, Robert M. Jopson, Member, IEEE and Roger H. Stolen—Nondestructive Position-Resolved Measurement of the Zero-Dispersion Wavelength in an Optical Fiber—journal of Lightwave Technology, vol. 15, No. 1, Jan. 1997.

* cited by examiner

*Primary Examiner*—Tu T. Nguyen
(74) *Attorney, Agent, or Firm*—Svetlana Z. Short

(57) ABSTRACT

A method for measuring longitudinal variation in chromatic dispersion in an optical fiber, comprising: (i) launching into a first end and a second end of optical fiber an optical signal at a wavelength $\lambda_1$ to collect backscatter power P(z) for different positions z within said optical fiber and providing measured OTDR backscatter traces; (ii) deriving from the measured OTDR backscatter traces at the single OTDR wavelength $\lambda_1$ either (a) the longitudinal MFD(z) data or (b) the relative MFD data; and (iii) calculating estimated longitudinal dispersion D(z) from the longitudinal MFD(z) data or the relative MFD data, without utilizing any other wavelength data.

11 Claims, 5 Drawing Sheets

METHOD OF ESTIMATING AND MEASURING LONGITUDINAL DISPERSION IN OPTICAL FIBERS

BACKGROUND OF THE INVENTION

1. Field of the Invention

The present invention relates generally to methods for estimating and measuring longitudinal dispersion in optical waveguide fibers.

2. Technical Background

Optical fiber has become a favorite medium for telecommunications due to its high capacity and immunity to electrical noise. However, chromatic dispersion can limit the bandwidth and the reach of optical fiber by producing pulse spreading due to various wavelengths of light traveling through the optical fiber at different speeds. Thus, different signal wavelengths arrive at a destination at different times, therefore causing the transmitted pulse to spread or "disperse", as it travels through the optical fiber.

Chromatic dispersion includes two components—one due to the core material's property and one due to waveguide dispersion of the fiber (defined by fiber's refractive index profile). One characteristic of dispersion is dispersion slope. Dispersion slope is a ratio of dispersion change with a change in wavelength. Dispersion slope can be either positive, or negative. A typical transmission fiber has a positive dispersion slope. A typical dispersion compensating fiber has a negative dispersion slope at the transmission wavelength. Dispersion value of a fiber, at a specific wavelength, can be either positive or negative. It is zero at the point where the dispersion curve crosses the horizontal (wavelength) axis. The wavelength at which the chromatic dispersion is zero is known as zero dispersion wavelength. A typical transmission fiber, such as SMF-28® has a zero dispersion wavelength of about 1310 nm. A typical dispersion shifted fiber has a zero dispersion wavelength of about 1550 nm. Other optical fibers have different zero dispersion wavelengths.

The need to satisfy demand for transmission capacity has led to dispersion management, which includes the use of dispersion compensating or dispersion managed fiber segments to compensate for dispersion introduced by the typical transmission fiber, for example SMF-28®. More specifically, the dispersion compensating fiber has dispersion and dispersion slope that are of opposite sign than that of the transmission fiber, which results in zero or nearly zero dispersion in the operating wavelength band.

To achieve this goal, the segment of dispersion compensating fiber (or dispersion shifted fiber) that is being coupled to transmission fiber must have a predetermined dispersion slope, and dispersion sufficient to compensate for the specific length of the transmission fiber. However, dispersion parameters can vary along the fiber length and from fiber to fiber, even among fibers of the same type. Thus, it is difficult to know before hand the precise length of the dispersion compensating fiber (or the length of the dispersion managed fiber segment) that is needed to compensate for dispersion introduced by the transmission fiber.

It is well known that the physical properties of the optical fibers can vary as the fiber is being drawn. This influences optical properties, especially dispersion. For any particular length of optical fiber, end-to end dispersion value can be easily measured, and the average dispersion (ps/nm/km) can be easily determined from this measurement. However, because dispersion parameters can vary as a function of fiber segment length, cutting the dispersion compensating fiber segment in half, for example, will typically provide either more or less than half of the total measured dispersion value. Thus, variability of dispersion parameters within the length of the same fiber makes it difficult to predict the precise length of the fiber segment that needs to be cut off from the long length of fiber to effectively compensate for chromatic dispersion introduced by transmission fiber.

One way to address this problem is to have a dispersion "map" that provides chromatic dispersion data along the length of the fiber or along the optical fiber span (which may include several spliced optical fibers). Several techniques have been developed to measure chromatic dispersion and zero dispersion wavelength variations along the lengths of the fiber. One technique based on the use of Optical Time Domain Reflectometry (OTDR) has been proposed for step-index fibers as described in an article entitled "Novel Technique for Measuring the Distributed Zero-Dispersion Wavelength of Optical Fibers", Electronics Letters 29, 426 (1993) by M. Ohashi and M. Tateda, incorporated by reference herein. This article teaches that if the doping of the fiber preform does not change over its length (no change in core composition), then the changes in the zero dispersion wavelength ($\lambda_0$) of the resulting fiber are due to the changes in the refractive index profile (i.e., due to changes in core size). This article discloses how to estimate dispersion as a function of longitudinal position, by knowing the fiber core's refractive index and by measuring the optical fiber's longitudinal mode field diameter (MFD) as a function of wavelength. The disclosed technique utilizes bidirectional OTDR data at multiple wavelengths to exactly determine the dependence of MFD upon wavelength. Thus, this approach requires extensive, time consuming data gathering. In addition, the disclosed technique requires the use of two or more OTDR laser sources. In addition, these methods require the use of pigtail (i.e., reference) fibers with characteristics that are very similar to that of the measured fiber.

Other reported techniques rely on the use of four-wave mixing (FWM) as a probe for the chromatic dispersion (D) or zero-dispersion wavelength ($\lambda_0$) fluctuation (see, for example, Y. Suetsugu, T. Kato, T. Okuno, and M. Nishimura, IEEE Phot. Lett. 7, 1459 (1995); S. Nishi and M. Saruwatari, Electron. Lett. 32,579 (1996); and M. Eiselt, R. M. Jopson, and R. H. Stolen, J. Lightwave Technol. 15, 135 (1997), all of which are incorporated by reference herein). The four wave mixing techniques to measure dispersion characteristics as a function of fiber lengths are described U.S. Pat. Nos. 5,956,131; 6,067,149; 5,619,320; and 6,118,523. However, these approaches also require extensive and time consuming data gathering with specialized equipment that operates at high power levels (so that the fiber is operating in a non-linear regime).

Therefore, there is a need to obtain a versatile method for measuring the change in dispersion as a function of longitudinal position in an optical fiber, without the need for multiple wavelengths measurements and without the need for additional equipment or equipment modification.

SUMMARY OF THE INVENTION

Definitions:

The following definitions and terminology are commonly used in the art.

Refractive index profile—the refractive index profile is the relationship between the relative refractive index ($\Delta\%$) and the optical fiber radius (as measured from the centerline of the optical fiber) over a selected portion of the fiber.

Radii—the radii of the segments of the fiber are generally defined in terms of points where the index of refraction of the material used takes on a different composition. For example, the core has an inner radius of zero because the first point of the segment is on the centerline. For a segment having a first point away from the centerline, the radius of the waveguide centerline to the location of its first refractive index point is the inner radius of that segment. Likewise, the radius of the waveguide from the centerline to the location of the last refractive index point of the segment is the outer radius of that segment. For example, a down-doped annular segment surrounding the core would have an outer radii located at the interface between the annular segment and the cladding.

Relative refractive index percent Δ%—the term Δ% represents a relative measure of refractive index defined by the equation:

$$\Delta\% = 100 \times (n_i^2 - n_c^2)/2n_i^2$$

where Δ% is the maximum refractive index of the index profile segment denoted as i, and $n_c$, the reference refractive index, is taken to be the refractive index of the cladding layer. Every point in the segment has an associated relative index measured relative to the cladding.

Optical time domain reflectometer (OTDR). The optical time domain reflectometer (OTDR) is an optoelectronic instrument used to characterize an optical fiber. An OTDR injects a series of optical pulses into the fiber under test. It also collects and measures, from the same end of the fiber, light that is scattered back and reflected back through the fiber. The intensity of the return pulses is measured and integrated as a function of time, and is plotted as a function of fiber length.

Mode field diameter (MFD) An expression of distribution of the irradiance, i.e., the optical power, across the end face of a single-mode fiber. For example, for a Gaussian optical power distribution in a single-mode optical fiber, the mode field diameter is that diameter at which the electric and magnetic field strengths are reduced to 1/e of their maximum values, i.e., the diameter at which optical power is reduced to $1/e^2$ of the maximum power, because the power is proportional to the square of the field strength.

According to the present invention the method for measuring longitudinal variation in chromatic dispersion in an optical fiber, comprises:

(i) launching a first signal into a first end and a second signal into a second end of the optical fiber, at a wavelength $\lambda_1$ to collect backscatter power P(z) for different positions z within the optical fiber and providing measured OTDR backscatter traces;

(ii) deriving longitudinal MFD(z) data or a relative MFD data from the measured OTDR backscatter traces, at the single OTDR wavelength $\lambda_1$; and (iii) calculating estimated longitudinal dispersion D(z) from said longitudinal MFD(z) data, or said relative MFD data, at the wavelength $\lambda_1$, without utilizing any other wavelength data.

According to some of the embodiments of the present invention, the step of calculating estimated longitudinal dispersion D(z) from the longitudinal MFD(z) data is performed by utilizing a polynomial mapping function, or a conversion table relating dispersion values to either MFD values or to the relative MFD values.

One advantage of the method according of the present invention is its capability to estimate a longitudinal chromatic dispersion of the optical fiber using measurements performed at only one wavelength and being capable to inexpensively predict fiber's dispersion characteristics without the need to destructively measure fiber dispersion. Thus we are now able to estimate longitudinal chromatic dispersion values along the length of an optical fiber, and therefore estimate what length of a given fiber meets customer specification, without the need to cut the fiber into progressively small lengths until one achieves the desired dispersion value. The method also provides a way for testing the optical fiber's dispersion uniformity to confirm that it is within the specified values.

Additional features and advantages of the invention will be set forth in the detail description which follows, and in part will be readily apparent to those skilled in the art from that description or recognized by practicing the invention as described herein, including the detailed description which follows, the claims, as well as the appended drawings.

DETAILED DESCRIPTION OF EMBODIMENTS

Figure 1:
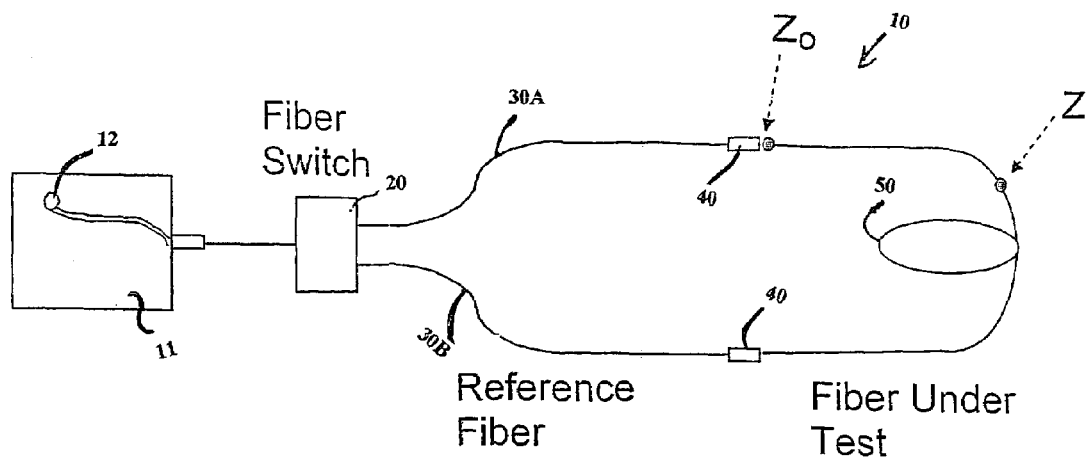
FIG. 1 is a schematic illustration of an apparatus for measuring OTDR data of an optical fiber.

Reference will now be made in detail to the present embodiments of the invention, examples of which are illustrated in the accompanying drawings. Whenever possible, the same reference numerals will be used throughout the drawings to refer to the same or like parts.

According to an embodiment of the present invention the method for obtaining longitudinal chromatic dispersion in an optical fiber comprises the steps of: (i) launching a first optical signal into a first end and a second optical signal into a second end of the optical fiber, at a wavelength $\lambda_1$, to collect back-scatter power P(z) for different positions z within the optical fiber and providing measured OTDR backscatter (intensity) traces $S_1(z)$ and $S_2(z)$, also referred to herein as OTDR traces; (ii) deriving, from the measured OTDR backscatter traces, at the single OTDR wavelength $\lambda_1$, either the longitudinal MFD(z) data, or the relative MFD data; and (iii) calculating longitudinal dispersion D(z) from either the longitudinal MFD(z) data, or the relative MFD data, at the wavelength $\lambda_1$ without utilizing any other wavelengths. It is noted that because the backscatter power P was collected at both ends of the optical fiber, the location of points z in the second OTDR trace $S_2(z)$ have been adjusted (flipped) so that position z is the same position within the fiber length for both OTDR traces $S_1(z)$ and $S_2(z)$. It should be noted that when using this method, it is only necessary to collect OTDR measurements at one wavelength $\lambda_1$ to provide longitudinal dispersion values D(z) and to predict dispersion uniformity at that wavelength, and that no other wavelength data (either measured or calculated) is required to provide longitudinal dispersion values D(z).

One technique which can be utilized in measuring optical fiber's longitudinal variation in chromatic dispersion can be explained as follows. Bidirectional OTDR traces of an optical fiber are performed, and the MFD values at various positions z within the optical fiber are determined from the measured bidirectional OTDR trace values I(z), where $I(z) = S_1(z) + S_2(z)$. We then determine the relationship between the longitudinal dispersion D and MFD. Once the relationship between the dispersion function D and the MFD is known, then for any fiber segment, D(z) can be easily determined from the values of MFD(z). Therefore, according to some of the embodiments of the present invention, the method for determining D(z) utilizes OTDR values measured at a single wavelength $\lambda_1$ to generate a longitudinal mode field diameter MFD(z) trace, which is then mapped to a longitudinal dispersion D(z) through use of a product specific dispersion vs. MFD mapping function and the average measured dispersion of the optical fiber.

Thus, different mapping functions (of dispersion vs. MFD) are derived for each fiber class, or family of optical fibers. These mapping functions may be incorporated into computer program (referred herein as mapping software). Then, when switching from one class of fibers to another class of fibers, the mapping software can be switched, without a change to the OTDR set-up to determine D(z) values for optical fibers within different fiber classes.

According to one embodiment of the present invention an apparatus for measuring bidirectional OTDR data is shown schematically in FIG. 1, and is designated generally throughout by the reference numeral 10. The apparatus 10 includes an OTDR module 11, containing a light source 12, an optical switch 20 that allows one single OTDR device to be used to take measurements on both ends of the optical fiber, and two sections of reference fiber 30A, 30B coupled via optical connector 40 to the optical fiber to be measured 50. Longitudinal positions $z_0$ and z correspond to the first end of the optical fiber 50 and some intermediate point in the optical fiber 50. The optical switch 20 first allows the light at wavelength $\lambda_1$ to propagate along the first section of the referenced fiber 30A and to enter one end (first end) of the fiber 50, and for the back-scattered light to exit through the same fiber end in order to enter the OTDR module 11. Upon the completion of the OTDR measurement by the OTDR module 11, the switch 20 blocks the light from propagating along this path, and instead the light now propagates along the second section of the reference fiber 30B and couples into the second end of the fiber 50, allowing the back-scattered light to exit through the same end (second end) of the fiber 50 in order to enter the OTDR module 11. This technique can be used on spooled fiber, particularly on a shipping spool, for example with fiber lengths being as long as 120 km, or under 100 km, and preferably under 80 km. This technique may also be used in cabled or installed fiber. The fiber length that may be measured with a single bidirectional OTDR measurement is determined by the OTDR dynamic range.

Thus, we utilize a combination of OTDR traces $S_1(z)$, $S_2(z)$, made from both ends of the spooled fiber 50 to calculate longitudinal MFD values. Fiber 50 may be, for example, a negative dispersion fiber, a typical transmission fiber, dispersion compensating fiber, or dispersion shifted fiber. Assuming that the longitudinal variations of both the Rayleigh scattering coefficient and the index of refraction in the fiber's core are not significant, the relationship describing the longitudinal MFD as a function of I(z) at a single wavelength $\lambda_1$ is $$MFD(z) = MFD(Z_o) * 10^{\Delta I/20} \qquad (1),$$

where $\Delta I$ is the difference between I(z) at the (first) fiber end position Zo, and an intermediate position z (i.e., $\Delta I = I(Z_0) - I(z)$). More specifically, OTDR traces $S_1(z)$ and $S_2(z)$ at a single wavelength $\lambda_1$ were obtained from both fiber ends (the first end corresponding to the Zo position). Then the OTDR trace $S_2$ (which obtained from the second end of the optical fiber 50) was flipped over (axially), so that OTDR values for the same points along the fiber lengths were lined up; and the flipped OTDR trace $S_2$ (which has an opposite slope to that of the other trace) was added to the OTDR trace $S_1(z)$ obtained from the first end of the optical fiber 50, to provide the bidirectional OTDR trace values I(z) at a single wavelength $\lambda_1$. It is noted that the bidirectional OTDR trace values alone, without any other data, can provide us with relative MFD values. Once the reference MFD value is chosen, which in this embodiment is the average MFD value of the reference fiber 30A, 30B, the actual MFD values of the optical fiber 50 may also be determined.

Figure 2:
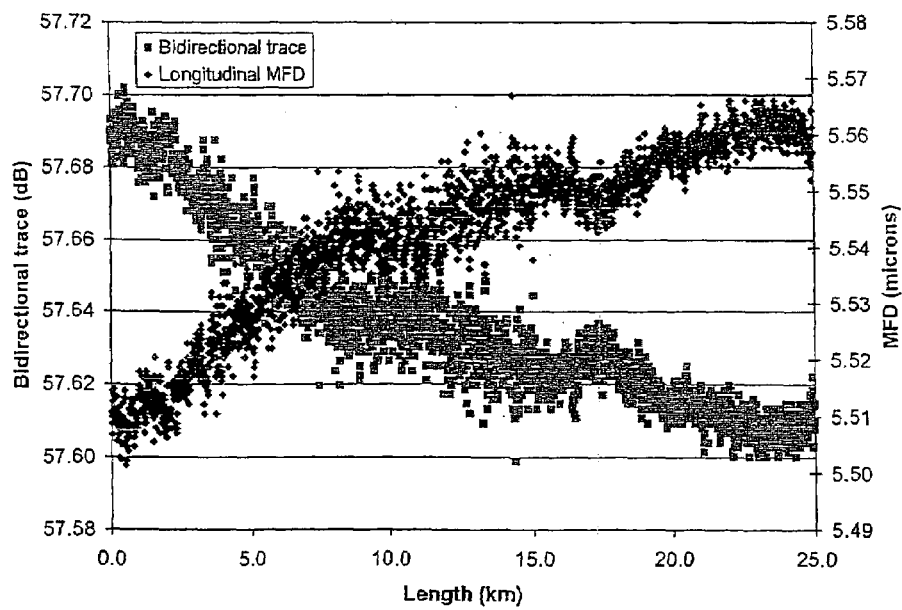
FIG. 2 is a graph of bidirectional OTDR trace produced by the apparatus of FIG. 1 and the resultant mode field diameter (MFD) data obtained from this OTDR trace.

FIG. 2 is a graph depicting bidirectional OTDR trace I(z), (light grey data points) of an exemplary fiber 50 and the resultant MFD values (dark grey data points) calculated by Equation (1), as a function of longitudinal distance z for an exemplary 25 km reel of optical fiber. For example, because the bidirectional OTDR trace value at zero km (i.e., at Zo) is about 57.69 dB and the bidirectional OTDR trace value at 10 km (z=10 km) is about 57.63 dB (See FIG. 2), $\Delta I$ is calculated to be $\Delta I = I(0) - I(10) = 57.69$ dB$-57.63$ dB$=0.06$ dB.

Chromatic dispersion D(z) is a sum of material (of fiber core) dispersion and the waveguide dispersion (which is a function of the fiber profile). In a typical optical fiber (made by the OVD, IVD, VAD, PCVD, or MCVD process) most of the longitudinal dispersion variation is due to variation of the fiber profile (e.g., fiber core radius). The changes in the longitudinal dispersion (that are due to variation of the fiber profile) are dependent on changes in the fiber's mode field diameter MFD(z). Thus, longitudinal chromatic dispersion D(z) can be determined by knowing the relationship between dispersion D(z) and the MFD(z) for a particular fiber product. The following describes one way to determine this relationship.

The relationship between estimated dispersion D(z) and the MFD(z) for any particular fiber product can be approximated, for example, by the polynomial fitting function, for example Equation (2), below.

$$\text{DISPERSION}'_{est}(z) = a_2 \cdot \text{MFD}(z)^2 + a_1 \cdot \text{MFD}(z) + a_0 \quad (2)$$

Determination of the coefficients for the polynomial fitting function can be accomplished by (i) selecting optical fibers which represent the range of desired optical properties for the fiber product (ex: range of dispersions or mode field diameters representing the fiber class or family); (ii) obtaining a bidirectional OTDR(z) trace I(z) which is done end-to end through the full length of the fiber 50, at the original fiber length; and then calculating MFD(z) for each of the optical fibers 50; and (iii) destructively measuring and determining longitudinal dispersion D(z) of a number of samples of optical fiber within the fiber family, by use of a standard dispersion (end to end) measurement on short pieces of each optical fiber.

Thus, we have generated longitudinal MFD(z) values for each spooled fiber 50 of a particular fiber class (i.e., optical fibers that have the range of the acceptable optical properties such as average measured MFD and average dispersion D for the entire fiber reel) and a set of data for the measured longitudinal dispersion D(z) for the corresponding set of fiber segments. This data can then be utilized to obtain a function of longitudinal dispersion D(z) as a function of MFD(z), e.g. Equation (2), as will be described in detail below.

EXAMPLE 1

Figure 3:
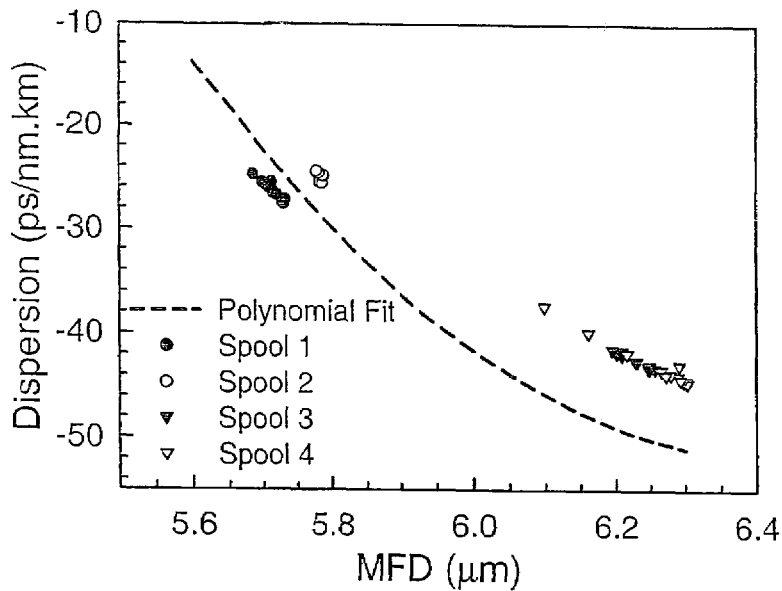
FIG. 3 shows longitudinal dispersion of an optical fiber, as determined from the measurements of the smaller fiber sections, and the longitudinal MFD generated from the bidirectional OTDR trace on the original fiber spool length, and a polynomial fit mapping the relationship between the measured dispersion values and MFD(z)

Four spools of exemplary optical fiber (25 km length) of the same class were chosen, such that the optical fibers had a range of desired optical properties (i.e., the range of average measured dispersions and MFDs corresponding to a chosen fiber class or fiber family). These fiber spools were measured for bidirectional OTDR trace data I(z). Each fiber spool was then cut into 2.2 km pieces, and each smaller piece was measured again for overall end to end dispersion. FIG. 3 shows longitudinal dispersion, as determined from the 2.2 km measurements, versus longitudinal MFD(z) values that were generated using Equation (1) from the bidirectional OTDR trace values I(z) on the original fiber spool length.

The experimental map between dispersion and MFD (see FIG. 3) suggested that the relationship between MFD and dispersion could be approximated as linear within a particular reel, so that estimated dispersion values within each fiber spool are approximately:

$$\text{DISPERSION}'_{est}(z) = m \cdot \text{MFD}(z) + b \quad (3)$$

Figure 4:
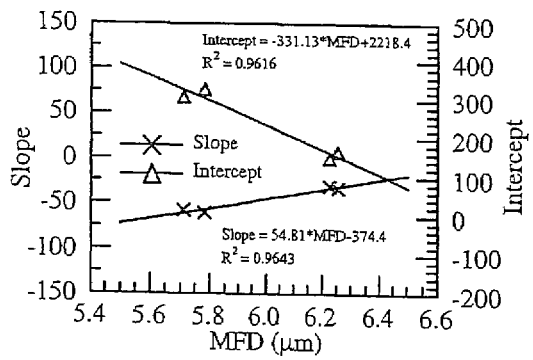
FIG. 4 illustrates the relationship between slope m, the intercept b, and MFD of exemplary optical fibers.

It has also been observed that MFD values for each reel of optical fiber 50 were scattered within a relatively narrow range. (See FIG. 3.) We have determined that both the slope m and the intercept point b of the Equation (3) are a function of MFD, and are dependent on an average MFD of a given reel of optical fiber. In order to determine the dependence of m and b on the MFD, we have plotted the slope m and the intercept b as a function of average MFD for each reel (FIG. 4) and we observed that both the slope m and the intercept value b changed linearly, as a function of MFD values. Thus, we determined that the slope m and the intercept b may be described as follows:

$$m = a_m \text{MFD}_{av} + b_m \quad (4a)$$

$$b = a^b \text{MFD}_{av} + b_b, \quad (4b)$$

where $a_m$, $b_m$, $a_b$ and $b_b$ are constants, and $\text{MFD}_{avg}$ is the average fiber reel MFD.

Therefore, we have determined that the slope m and intercept b of Equation (3) are functions of the average MFD of the fiber reel. For example, the two fiber reels which had lower average MFD (5.70–5.80) values showed a higher slope in FIG. 3 than the two fiber reels which had a higher average MFD (6.20–6.30).

The two equations (4a and 4b) for the slope m and the intercept b were then substituted into Equation (3), resulting in a second order polynomial with coefficients $a_1$, $a_2$, and $a_3$ as referenced in Equation (2). More specifically, since $\text{DISPERSION}'_{est}(z) = m \cdot \text{MFD}(z) + b$, then $\text{DISPERSION}'_{est}(z) = (a_m \text{MFD}_{av} + b_m) m \cdot \text{MFD}(z) + a_b \text{MFD}_{av} + b_b$. However, because MFD(z) is about equal to $\text{MFD}_{av}$, the expression for dispersion can then be written as $\text{DISPERSION}'_{est}(z) = a_2 \cdot \text{MFD}(z)^2 + a_1 \cdot \text{MFD}(z) + a_0$.

Note, that the resulting fit is not synonymous with using a best fit technique to fit the raw data with a second order polynomial. This is apparent by examining FIG. 3. The polynomial fit (Equation (2)) has properly characterized the slope of the curve (ΔD/ΔMFD) but does not necessarily minimize the error between it and the data points. There may be other mathematical functions, for example such as logarithmic forms, which can also characterize the slope of the dispersion curve in FIG. 3.

Thus, as stated above, FIG. 3 illustrates (i) measured dispersion D as a function of measured MFD, and (ii) a polynomial fit of the relationship between measured dispersion and measured mode field diameters. This fit (or polynomial curve) can now be used to calculate ΔD(z) as a function of ΔMFD(z) for a given fiber class. Since this mapping function is clearly dependent on the refractive index profile of the optical fiber 50 under test, it needs to be established only once, assuming no significant changes are made to the desired refractive index profile of the optical fiber type. All other fiber spools of this particular fiber class (or fiber family) can be measured to obtain bidirectional OTDR trace data I(z) via a set-up similar to that of FIG. 1, which is then converted to the MFD(z) data, which can then be inserted into the previously determined function for the longitudinal dispersion D(z), to provide the estimated values D(z) along the length of the spooled fiber 50. Thus, once we determine what polynomial defines the relationship between dispersion and MFD, as many optical fiber spools (within the fiber class or family) as needed can be analyzed in this manner, and longitudinal dispersion values can be determined without the need to cut the spooled fiber. These values are useful for determining the amount of dispersion variation which exists within a reel, e.g., looking at differences in D(z) within a reel. In order to use the data as extracted from Equation (2) as accurate dispersion estimates, it must first be normalized to the overall dispersion of the reel, as described below. This is why the nomenclature of Equation (2) uses the term $\text{Dispersion}_{est}$ (estimate) rather than $\text{Disperison}_{predict}$ (predicted dispersion), used in Equation (5), below.

The dispersion mapping function, for example that of Equation (2), is designed to map changes in longitudinal MFD to the changes in longitudinal dispersion. This data can be useful for differentiating fiber spools according to their longitudinal dispersion characteristics. Fiber spools with larger longitudinal dispersion variation may be restricted from certain applications, or perhaps be mitigated prior to leaving the manufacturing environment by removing highly variable sections of fiber.

Bias Adjustment to the Estimated Dispersion

In order to generate more accuracy in predicted dispersion values, the longitudinal dispersion values as estimated by Equation (2) are adjusted such that the average of the predicted longitudinal dispersion equals to the averaged end-to end fiber dispersion measurement. The adjustment is done by utilizing the average dispersion of the spooled fiber obtained from the standard end to end dispersion measurement of that fiber, by the following equation:

$$D(z) = DISPERSION_{predict}(z) \qquad (5)$$
$$= DISPERSION'_{est}(z) + \left[ \frac{(DISPERSION_{avg}) - \sum_{x=1}^{n} DISPERSION'_{est,x} * L_x}{L} \right]$$

where $DISPERSION_{predict}(z)$ provides predicted dispersion values at position z, after the bias adjustment; $DISPERSION_{avg}$ is the end to end measurement of the fiber spool normalized to the length of the fiber; $DISPERSION_{est,x}$ is estimated dispersion for several sections (smaller pieces of the fiber); $L_x$ is the length of each of the n smaller pieces of fiber for which the dispersion has been estimated; L is the total length of the spool; and $$\left[ (DISPERSION_{avg}) - \frac{\sum_{x=1}^{n} DISPERSION'_{est,x} * L_x}{L} \right]$$

is the calculated bias.

Thus, the current method can utilize three commonly available measurements (reference fiber MFD or/and bidirectional OTDR trace I(z) and the end to end dispersion) to estimate longitudinal dispersion D(z) for a spool of fiber. No other special measurements or additional equipment are needed in order to obtain an estimate of the longitudinal dispersion.

Depending on the resolution of the OTDR data and on the resolution required for the longitudinal dispersion, it may be more useful to generate a rolling average of the estimated longitudinal dispersion rather than use the raw output from Equation (2). This allows us to: (i) filter noise due to the small variations in OTDR backscatter trace data; and (ii) conform to specification requirements for dispersion uniformity over predetermined fiber segments of specified length.

Figure 5:
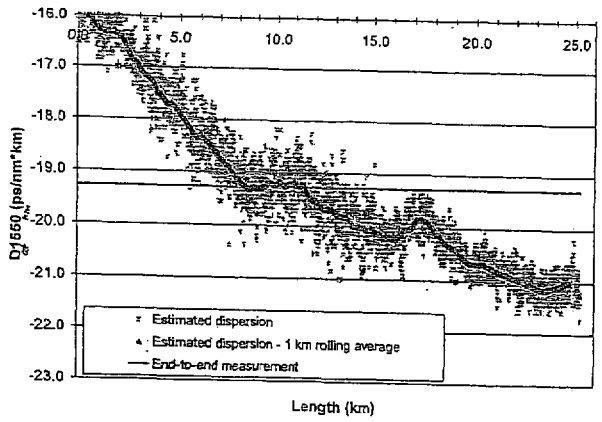
FIG. 5 illustrates an example of (i) calculated longitudinal dispersion for an optical fiber, which was derived from a bidirectional OTDR trace with a resolution of approximately 10 m, (ii) the end-to end (average) dispersion of this optical fiber and (iii) the rolling 1000 m average of the longitudinal dispersion D(z)

FIG. 5 depicts predicted longitudinal dispersion values, as calculated from Equation (5), which was derived from a bidirectional OTDR trace I(z) of an exemplary negative dispersion fiber, with a resolution of approximately 10 m. The vertical axis corresponds to the dispersion values D(z) (measured in ps/nm/km). The horizontal axis corresponds to a longitudinal position z (measured in km) along the optical fiber length. A rolling 1000 m average (gray curve) was chosen as a convenient way to view the longitudinal dispersion trend given the large amount of raw data available. That is, a rolling 1000 m average included 100 data points, with 50 data points included on either side of the longitudinal position of interest. To generate one data point on the graph, the 100 data points were averaged to minimize data variability. The horizontal line, just below −19 ps/nm/km value corresponds to measured average end-to end dispersion of the optical fiber. The predicted dispersion values (at λ=1550 nm) of this exemplary fiber are between about −16 ps/nm/km and about −21 ps/nm/km.

Other types of averaging may be more relevant. For example, if the smallest individual fiber length utilized in a particular cable design is 4 km, then dependant on specified resolution requirements, it may be useful to use a rolling 0.5 km to 4 km average to detect any portion of a fiber spool that may have dispersion values outside of the specified dispersion value range.

The invention will be further clarified by the following examples.

EXAMPLE 2

Figure 6:
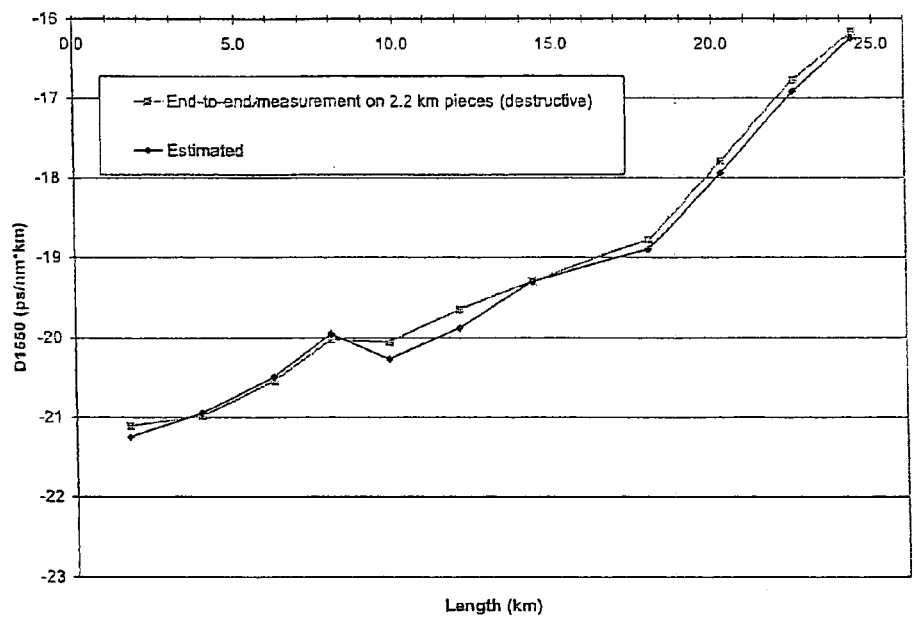
FIG. 6 is a plot of estimated longitudinal dispersion versus measured longitudinal dispersion for one of the fiber spools.

In order to illustrate the capabilities of the above described method, the method was applied to a set of six (6) reels of a negative dispersion terrestrial fiber 50 for which the mapping function had been determined as described above. The overall length of this optical fiber was about 25 km. Each fiber reel was measured for the bidirectional OTDR trace and the end to end dispersion. Then the fiber was cut to 2.2 km pieces and each piece was measured again for end to end dispersion. The estimated longitudinal dispersion for each fiber reel was calculated using Equation (5), and a 1000 m rolling average was applied. FIG. 6 illustrates the relationship between longitudinal chromatic dispersion and the distance z within the fiber of a first exemplary optical fiber 50. The vertical axis corresponds to dispersion (ps/nm/km) and the horizontal axis depicts position z within the optical fiber core. In FIG. 6 the darker curve corresponds to the predicted values of longitudinal dispersion D(z). The lighter curve corresponds to the measured values of longitudinal dispersion. As stated above, these measurements were done destructively, by cutting the fiber into 2.2 km segments and measuring end-to end dispersion values of these segments. FIG. 6 shows that the predicted longitudinal dispersion values closely match measured values. The residual dispersion error, averaged over each examined location, is 0.1 ps/nm*km, where this error is defined as the absolute value of the measured dispersion value minus the estimated dispersion value.

It is noted that instead of using the equation for dispersion D as a function of MFD, we can also utilize a conversion table that has dispersion values corresponding to the MFD values. Such conversion tables are functionally equivalent to the equation for dispersion D, as a function of MFD.

Thus a method for measuring longitudinal variation in chromatic dispersion in an optical fiber may include the step of obtaining variation of dispersion ΔD(z) as a function of the length of fiber, wherein the variation of dispersion ΔD(z) is compared to a predetermined allowed dispersion variation within the allowed ΔD range (Dmax and Dmin) to screen fiber for dispersion variability.

Figure 7:
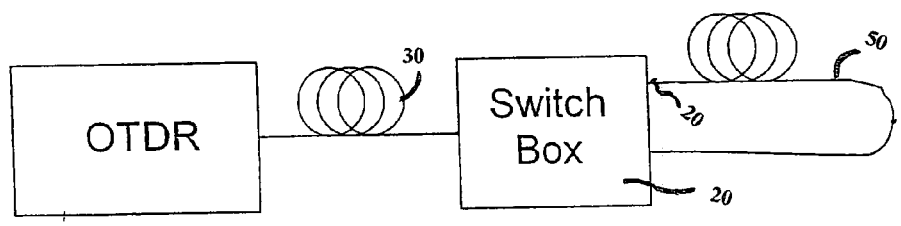
FIG. 7 is a schematic illustration of another apparatus for measuring OTDR data of an optical fiber.

According to another embodiment of the present invention, an apparatus 10 for measuring bidirectional OTDR trace data I(z) is shown schematically in FIG. 7. The apparatus 10 includes an OTDR module 11, an optical switch 20 that allows one single OTDR device to be used to take measurements on both ends of the optical fiber 50, and one section of fiber 30 situated between the switch 20 and the OTDR module 11. The optical switch 20 allows the light at wavelength $\lambda_1$ to enter one end (first end) of the fiber 50, and for the back-scattered light to exit trough the same end in order to enter the OTDR module 11. Upon the completion of the single OTDR backscatter trace measurement $S_1(z)$, the switch 20 blocks the light from propagating along this path, such that the light now couples into the second end of the fiber 50, allowing the back-scattered light to exit trough the same end (second end) of the fiber 50 in order to enter the OTDR module 11 for the second OTDR backscatter trace measurement $S_2(z)$.

The second embodiment of the method for calculating longitudinal dispersion values is also based on using single wavelength bidirectional OTDR trace I(z). More specifically, we have found that the relationship between the dispersion D and the relative MFD is invariant for the optical fibers with modest variations of refractive index profiles, when the reference MFD value (i.e., $MFD_0$) of these optical fibers corresponds to the same chromatic dispersion value. Therefore, we can define dispersion D as a function of relative MFD. The relative MFD is defined as $\Delta MFD$ normalized to the predetermined MFD value (i.e., $\Delta MFD/MFD_0$), where $\Delta MFD=MFD-MFD_0$. It is noted that $MFD_0$, for the purpose of this equation, is the MFD of the optical fiber 50 from the specified fiber family (or fiber class) that corresponds to the same predetermined or measured dispersion value (ps/nm km). For example, for an optical fiber 50 with a given refractive index profile, if the predetermined dispersion value of 3.8 ps/nm/km corresponds to MFD of 4.2 µm, then $MFD_0=4.2$ µm. Then, longitudinal dispersion D(z) of the optical fiber 50 can be determined by substituted measured relative MFD values of the optical fiber at positions z (obtained from the bidirectional OTDR traces I(z)) into the equation for dispersion D, where D is a function of relative MFD. Thus, because the relationship between the dispersion D and the relative MFD is invariant for the same family (or class) of optical fibers, mapping between the dispersion D and the relative MFD (i.e., finding a relationship that determines D values from the given $\Delta MFD/MFD$ values) can be achieved by numerical means.

It is noted that instead of using the equation for dispersion D as a function of relative MFD, we can also utilize a conversion table that has dispersion values corresponding to the relative MFD values. Such conversion tables are functionally equivalent to the equation for dispersion D, as a function of relative MFD.

According to one example the second embodiment for the method for estimating longitudinal dispersion D(z) in an optical fiber 50 includes the following steps:

(1) Obtaining the chromatic dispersion value at one end of the fiber (this is done destructively on a small fiber sample, for example 1 m to 2 km length);

(2) Obtaining numerically the MFD value corresponding to this dispersion value for the fiber with a given refractive index profile, set this MFD value to be $MFD_0$; and (3) Building a map between the dispersion D and relative MFD (i.e. $(MFD-MFD_0)/MFD_0$) through numerical modeling and determining from this map the relationship between dispersion D and relative MFD, in order to define chromatic dispersion D as a function of relative MFD;

(4) Obtaining the relative MFD(z) values along the length of the fiber 50 from single wavelength bidirectional OTDR trace measurements by utilizing, for example, the measurement apparatus 10 shown in FIG. 1 or 7;

(5) Obtaining longitudinal chromatic dispersion values D(z) from the measured relative mode field diameter values (from the previous step) by substituting these measured relative mode field diameter values (at each position z along the fiber axis) into the dispersion function (or the conversion table) obtained in the above step (3).

It is noted that dispersion function, i.e., dispersion as a function of relative MFD (i.e., $MFD/MFD_0$) can be expressed by the following polynomial:

$$D = \sum_{i=0}^{N} a_i (\Delta MFD/MFD_0)^i,$$

where and $a_i$ are associated coefficients. It is preferable that $i \leq 10$, and more preferable that $i \leq 5$ and even more preferable that the maximum value of i be N where: $2 \leq N \leq 5$.

Thus, if the fiber dispersion at one end of the fiber 50 is known, we can obtain the relationship between the dispersion D(z) and relative MFD. That is, D is a function of normalized MFD and we can obtain this functional relationship (disperson function) numerically. The dispersion value at each location D(z) can then be found by plugging the measured relative MFD values at the specific locations z to the dispersion function. It is noted that different optical fibers within the same fiber class or fiber family have slightly different refractive index profiles. The method of estimating longitudinal chromatic dispersion, according to this embodiment of the present invention, is based on realization that the dispersion vs. relative MFD is invariant across different slight variants of refractive index profiles when the reference MFD (i.e., $MFD_0$) corresponds to the same dispersion value, even though these fibers have slightly different refractive index profiles.

EXAMPLE 3

Figure 8:
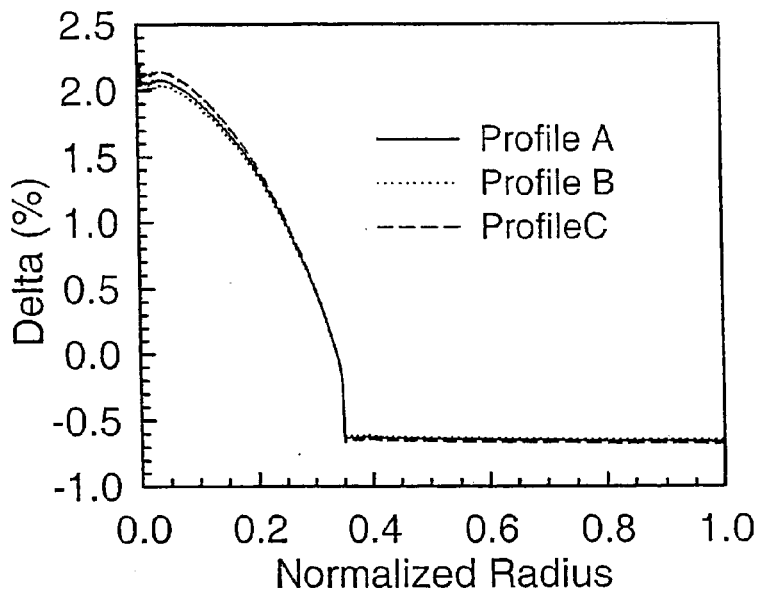
FIG. 8 illustrates refractive index profiles for three exemplary optical fibers 50.

In this example, we consider another fiber family. The index profile for this type of optical fiber is shown in FIG. 8. More specifically, FIG. 8 illustrates the refractive index profile (profile A) of an exemplary optical fiber, but without the cladding (the cladding was pure silica). The refractive index delta % of this optical fiber was normalized relative to that of silica (which has refractive index delta of zero). Because, as stated above, different optical fibers within the same family may have slightly different refractive index delta profiles, we had studied several the optical fibers of this type, by scaling the refractive index delta by 98% (profile B) and 103% (profile C). We had also varied the size of fiber core radius from 6 µm (profile A), to 9 µm (profile C). Thus, FIG. 8 shows the delta % of a function of normalized radius.

Figure 9:
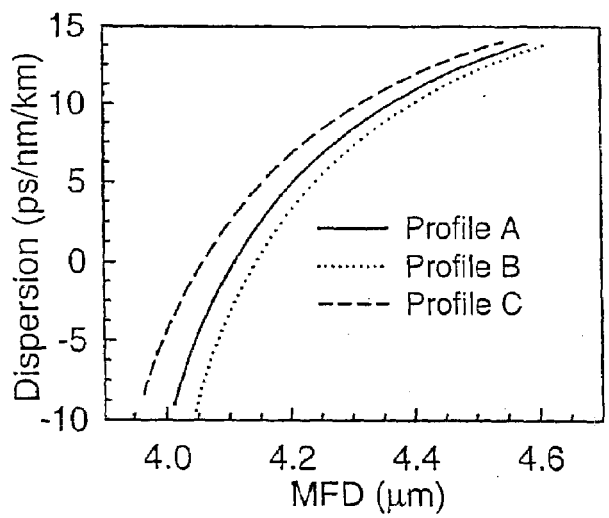
FIG. 9 illustrates relationship between dispersion and MFD for the three exemplary optical fibers corresponding to the fiber profiles of FIG. 8.

We then studied the relation between the dispersion and MFD for these three exemplary optical fibers (profiles A, B and C). As expected, by slightly varying the radial scaling factor we observed that both MFD and dispersion D vary. FIG. 9 shows the relation between the dispersion D and MFD for the three optical fibers with refractive index profiles shown in FIG. 8 (profiles A, B and C). Each fiber profile corresponds to a different dispersion curve. More specifically, FIG. 9 illustrates that each change of the fiber index profile for this class (family) of optical fibers corresponds to a different relation between dispersion and MFD.

Figure 10:
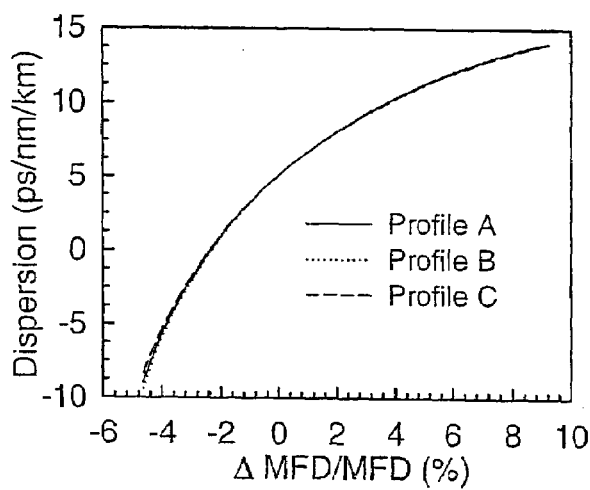
FIG. 10 is a plot of dispersion D as a function of relative mode field diameter (ΔMFD/MFD) for each of these three exemplary fibers.

However, when dispersion D was plotted as a function of relative mode field diameter ($\Delta MFD/MFD$) for each of these three fiber examples, dispersion curves appeared to be on top of one another. This is shown in FIG. 10. It is noted that for each of these optical fibers slightly different reference $MFD_0$ value was chosen, in order to provide the identical corresponding dispersion value. The reference $MFD_0$ for each of the exemplary fiber was chosen to be the MFD value that corresponds to the dispersion of 5.04 ps/nm/km at $\lambda=1550$ nm. In the practical use of the measurement method, this is the dispersion at the beginning end of the fiber (Zo). Thus, for the optical fiber with profile A the $MFD_0$ is 4.21 µm and the core radius is 7.2 µm, for the optical fiber with profile B the $MFD_0$ is 4.24 µm and the core radius is 7.2301 µm and, for the optical fiber with profile C the $MFD_0$ is 4.16 µm and the core radius is 7.1464 µm. FIG. 10 illustrates that dispersion D as function of relative MFD is virtually the same for each of the three exemplary fibers. Therefore, once the relative MFD values are measured for a given fiber 50, they can be inserted into dispersion function to obtain estimated dispersion values D(z), without the need to destructively measure dispersion as a function of length and without needing to know the precise index profile of each fiber within the fiber family.

The results illustrated in FIG. 10 suggest that the choice of a fiber with a specific refractive index profile (out of other fibers of the same type) is not critical for deriving the equation for D as a function of the relative mode field diameter. As long as the approximate fiber 50 profile (±5% index delta) is known, we can obtain the correct relation between the dispersion and relative MFD. However, it is more preferred for the index delta and the core radius within the fiber family varied by ±3% or less. Since the relative MFD(z) along the fiber is easily measurable, knowledge that dispersion as a function of relative MFD (for the same fiber family) is invariant enables us to calculate estimated longitudinal dispersion D(z). When the dispersion and relative MFD (i.e., $\Delta MFD/MFD_0$) data were fitted to a polynomial, the dispersion function D was determined to be described by the following polynomial:

$D = \Sigma a_i (\Delta MFD/MFD_0)^i = 0.0001 (\Delta MFD/MFD_0)^5 - 0.0022(\Delta MFD/MFD_0)^4 + 0.017(\Delta MFD/MFD_0)^3 - 0.1384(\Delta MFD/MFD_0)^2 + 1.7018(\Delta MFD/MFD_0) + 5.0432.$ We had also analyzed the effect on distortion from different kinds of fiber profile perturbations. One optical fiber profile can be different from another optical fiber profile by means other than simple scaling. As an example, we considered a partially modified refractive index profile (from that of profile A shown in FIG. 8). We scaled the delta of the positive part of the refractive index profile by 98% while keeping the negative part of the refractive index profile unchanged to obtain fiber profile D. We then varied the radial scaling to induce both MFD and dispersion change. In this example the reference $MFD_0$ values for the optical fibers with profiles A and D were chosen to have the same corresponding dispersion of 5.04 ps/nm/km at 1550 nm. Thus, the optical fiber with profile A has $MFD_0$ of 4.21 µm and the core radius of 7.2 µm, and for the optical fiber with profile D the $MFD_0$ is 4.2325 µm and the core radius is 7.204 µm. We found that dispersion, as a function of relative MFD, is virtually the same for both optical fibers (profiles A and D). That is, relationship between dispersion and relative MFD is still invariant.

Figure 11:
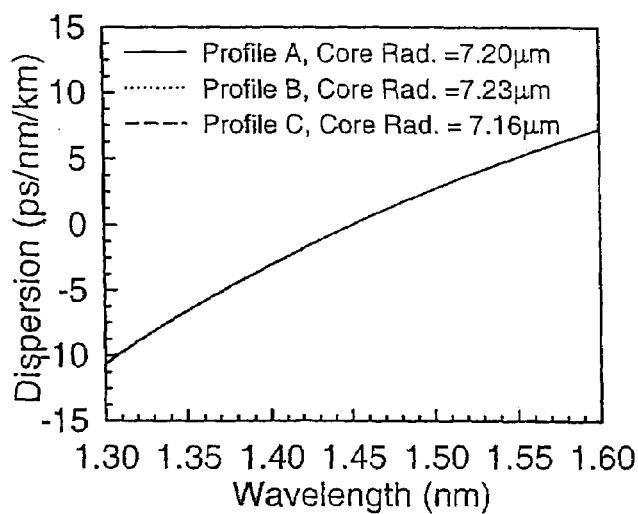
FIG. 11 illustrates that when the dispersion value at one wavelength is set to be the same for each of the fibers, by choosing a proper radial scaling factor, dispersion is invariant across the operating wavelength range.

In optical fibers, for example dispersion compensating fibers, the refractive index profile varies from one fiber preform to another. However, the resultant change in dispersion can be mitigated by the radial scaling (i.e., scaling the core radius or down), as commonly used in the production. Once the dispersion at one wavelength is brought back to the target value, dispersion curves of the "scaled fiber" across a wide range of wavelengths are also brought back to the target performance. This is illustrated in FIG. 11. This result suggests that the dispersion performance shown in FIG. 10 is invariant across the operating wavelength range. FIG. 11 also illustrates that at the wavelength $\lambda=1550$ nm, the dispersion value is 5.04 ps/nm/km.

As described above, the relative MFD of an optical fiber can be measured via the bidirectional OTDR trace I(z). The bidirectional OTDR traces I(z) may be obtained by adding the OTDR (intensity) trace from each end of the optical fiber 50. If the resultant OTDR backscatter intensity traces (measurements) are labeled $S_1(z)$, and $S_2(z)$ respectively, the bidirectional OTDR intensity trace data obtained from both end of the fiber 50 are added together to get the $I(z)=S_1(z)+S_2(z)$. It is noted that prior to this addition the second measured OTDR trace was flipped so that its z values correspond to the z values of the first OTDR trace.

A reference position $z_0$, which is from the beginning end of the fiber 50, is chosen so that a $\Delta I(z)$ can be defined as $\Delta I(z)=I(Z_0)-I(z)$. This variable $\Delta I(z)$ is related to the Mode Field Diameter MFD(z) through Equation (1). Thus, if $MFD(Z_0)=4.2$ µm, $MFD(z)=4.2*10^{\Delta I(z)/20}$ It is clear that the bidirectional OTDR trace I(z) can be used to measure the relative MFD change along the length of the optical fiber 50. For the convenience of later use, we defined the relative MFD to be, $$\Delta \tau(z) = \frac{\Delta MFD}{MFD}(z) = (MFD(z) - MFD(Zo))/MFD(Zo) \qquad (6)$$

EXAMPLE 4

Figure 12A:
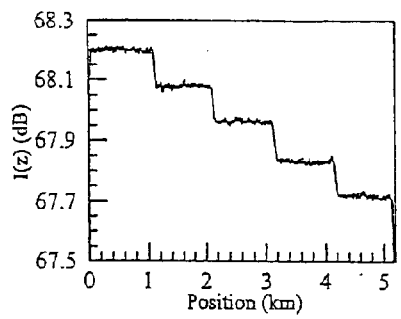
FIG. 12A illustrates the change in a bidirectional OTDR trace I as a function of the longitudinal position z within another exemplary optical fiber.
Figure 12B:
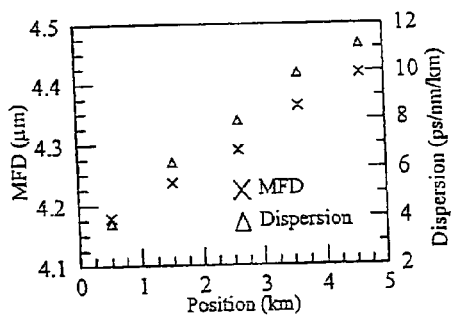
FIG. 12B shows predicted estimated MFD and values of dispersion D at several positions along the length of the exemplary fiber corresponding to FIG. 12.

We have studied another optical fiber 50 with a fiber profile based on the optical profile A shown in FIG. 8, but with a variable radial scaling along the fiber length. The fiber radius was altered (scaled up) with a step-like change approximately every 1 km. Using the bidirectional OTDR trace measurements, we have obtained the values for parameter I(z) along the fiber length. The effect of the change in fiber diameter on I is shown in FIG. 12A. At the first end of this optical fiber (the end with smaller diameter at the location $Z_0$ (or Z=0)), the measured dispersion was 3.751 ps/nm/km and MFD was 4.2 µm, and at the second end (the end with larger diameter) the measured dispersion was 10.246 ps/nm/km, and MFD was 4.4 µm. We had chosen $MFD_0$ to correspond to the dispersion of 3.751 ps/nm/km. The relative MFD values of this fiber, at different longitudinal positions z, were calculated by using Eq.(6). Using the measured dispersion at the first end of the optical fiber 50, we established the relation between the dispersion and the relative MFD. The predicted MFD(z) and dispersion D(z) in several positions along the exemplary fiber 50 is shown in FIG. 12B. Based on our calculations, the dispersion near the end of the fiber 50 is predicted to be 11.17 ps/nm/km. This is fairly close to the measured dispersion value of 10.25 ps/nm/km. We believe the slight error is due to a less accurate measurement of dispersion at both ends of the fiber. Note that dispersion values were measured on a short fiber sample(s) (few meters in length), and better accuracy can be achieved if the measurement is done on a longer fiber piece.

We also studied the sensitivity (or resolution, which is the capability to detect small changes) of the measurement method. In each step of the graph of FIG. 12A, there is a little fluctuation in the bidirectional OTDR trace values I, which corresponds to fluctuation in MFD. By attributing this variation to measurement uncertainty we can calculate the dispersion sensitivity to MFD changes for this fiber sample. The standard deviation of the local fluctuation in the bidirectional OTDR trace values I (see FIG. 12A) corresponds to ΔMFD of 0.05 dB. (This change in MFD can be calculated by Equation (1), above.) When the MFD is changed by 1.4%, the uncertainty in MFD measurement is only 0.05% of the MFD value. This uncertainty in MFD measurement corresponds to uncertainty in dispersion calculation, or dispersion sensitivity measurement of 0.06 ps/nm/km. Note that this sensitivity can be different for different type of fiber (refractive index profile), but its value can be determined once the fiber's refractive index profile is specified.

We also noticed that the predicted MFD values at two ends of the fiber are 4.18 µm and 4.42 µm, respectively. When these MFD values are rounded to single decimal digit, they are the same as the measured MFD values of 4.2 µm and 4.4 µm. However, the difference between the single digit and double digit numbers may be large enough to cause significant errors if they are used to predict dispersion value. This suggested that the choice of using dispersion at one end of the fiber instead of MFD at the same end is a better one for more accurate dispersion prediction.

In certain situations, it may be preferred not to cut a segment of fiber and measure it for dispersion reference. In that case, the total accumulated dispersion across the whole fiber can be used as an alternative reference dispersion value. Slightly more complicated procedure is needed to predict the dispersion along the fiber length. Note that the dispersion vs. relative MFD depends on the relative MFD and the dispersion value at a reference position, which is labeled as $D(D_0,\Delta\tau(z))$, where $D_0$ is the dispersion at the beginning portion of the fiber and $\Delta\tau(z)$ is the relative MFD as defined by Equation (6). When total dispersion (i.e., accumulated or end-to end dispersion (ps/nm)) of the fiber 50 is known, the reference dispersion $D_0$ can be figured out by numerically solving the following equation, $$\int_0^L D(D_0, \Delta\tau(z))dz = \text{Total Dispersion} \quad (7)$$

More specifically, the correct value for $D_0$ may be determined by trying iteratively to substitute several values of Do into Equation (7), and then integrating over the length of the fiber (L), until the resultant total dispersion value corresponds to the measured total dispersion of the given fiber.

Thus, according to an example the second embodiment for the method for estimating longitudinal dispersion D(z) in an optical fiber 50 includes the following steps:

(1) Obtaining end-to end single wavelength total (i.e., accumulated) dispersion value of the optical fiber 50 (ps/nm);

(2) Obtaining the relative MFD(z) values along the length of the fiber 50 from a single wavelength bi-directional OTDR backscatter trace data by utilizing, for example, the measurement apparatus 10 shown in FIG. 1 or 7;

(3) Solving Equation (7) to determine dispersion of dispersion $D_0$ by utilizing the measured value of total end-to dispersion obtained in step (I);

(4) Obtaining numerically the MFD value corresponding to this dispersion value $D_0$ for the fiber with a given refractive index profile, this dispersion value is $MFD_0$; and (5) Building a map between the dispersion D and relative MFD (i.e. $(MFD-MFD_0)/MFD_0$) through numerical modeling and determining from this map the relationship between dispersion D and relative MFD, in order to define chromatic dispersion D as a function of relative MFD. The dispersion values can then be found from the corresponding relative MFD values via a conversion table or a polynomial equation, for example; and (6) Obtaining longitudinal chromatic dispersion values D(z) from the measured relative mode field diameter values (from step 2) by substituting these measured relative mode field diameter values (at each position z along the fiber axis) into the dispersion function (or the conversion table) obtained in the above step (5).

EXAMPLE 5

Figure 13A:
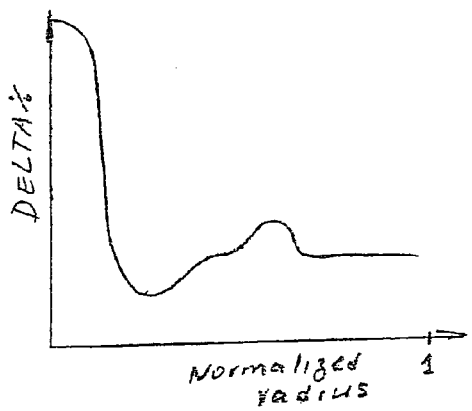
FIG. 13A illustrates a normalized refractive index profile of another exemplary optical fiber 50.

In this example, we consider another optical fiber family. The normalized refractive index profile of the fiber (profile E) is shown in FIG. 13A. This figure illustrates the delta profile of this exemplary fiber, but without the cladding (the cladding was pure silica). The refractive index delta % was normalized relative to that of silica (which has refractive index delta of zero). Our study of this fiber family also demonstrated that the dispersion vs. relative MFD is essentially invariant over different perturbations.

More specifically, we mapped the relation between the dispersion and MFD for four slightly different refractive index profiles (profile E, F, G and H) of the optical fibers within this fiber class or fiber family. The difference between these profiles is created by scaling slightly the index delta of the optical fiber of FIG. 13B. Refractive index delta % profiles F and G were obtained by scaling refractive index delta of profile E by 98% and 103%, respectively. To obtain profile H only the negative dispersion region was scaled by 98%. Further change of dispersion vs. MFD is caused by scaling the fiber radially. We had varied the fiber diameter (corresponding to the relative radius of 1, in FIG. 13A) from 12.5 µm, to 14.0 µm. This result is similar to that illustrated in FIG. 9, where dispersion vs. MFD also followed different curves when the refractive index profile was altered.

Figure 13B:
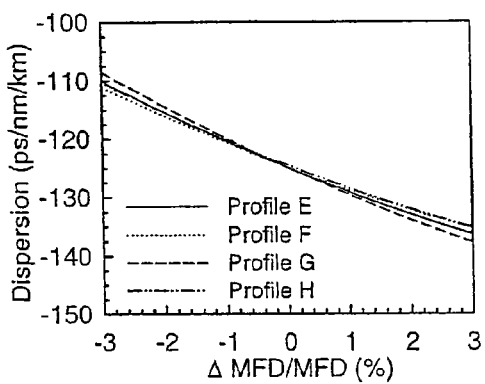
FIG. 13B illustrates the relationship between dispersion and relative MFD for four slightly different optical fibers (profiles E, F, G and H).

We then calculated dispersion as a function of relative MFD (see FIG. 13B). In this example, the reference MFD (i.e., $MFD_0$) corresponds to the dispersion of -125 ps/nm/km at λ=1550 nm. That is, for each of these optical fibers, a slightly different $MFD_0$ value was chosen in order to provide the identical corresponding dispersion value of -125 ps/nm/km at λ=1550 nm. Thus, for the optical fiber with profile E the $MFD_0$ is 5.1308 a µm and the core radius is 13.073 µm, for the optical fiber with profile F the $MFD_0$ is 5.2197 µm and the core radius is 13.162 µm, for the optical fiber with profile G the $MFD_0$ is 5.008 µm and the core radius is 12.9409 µm; and for the optical fiber with profile H the $MFD_0$ is 5.1635 µm and the core radius is 13.0407 µm. FIG. 13B illustrates that the four dispersion curves (dispersion vs. relative MFD) agree with each other fairly well. If we look at the percent difference between these dispersion curves, they are quite small. Thus, the relationship between dispersion and relative MFD for these fibers is essentially invariant. We had also studied dispersion as a function of wavelength for these four exemplary fibers (profiles E, F, G, H) when their dispersion at 1550 nm is chosen to be -125 ps/nm/km. We observed that over 300 nm wavelength range, the dispersion of these optical fibers have essentially the same wavelength dependence (i.e., the curves of dispersion (ps/nm/km) vs. wavelength, for the wavelength range of 1.3 µm to 1.6 µm were essentially identical).

Thus, once the relative MFD values are measured for a given fiber 50, they can be inserted into the equation of dispersion as function of relative MFD to obtain estimated dispersion values D(z), without the need to destructively measure dispersion as a function of length and without needing to know the precise index profile of each fiber within the fiber family.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method for measuring longitudinal variation in chromatic dispersion in an optical fiber, comprising:
   (i) launching a first signal into a first end and a second signal into a second end of said optical fiber, at a wavelength $\lambda_1$, to collect back-scatter power P(z) measurements for different positions z within said optical fiber and providing measured OTDR backscatter traces generated by the time generated by an optical time domain reflectometer;
   (ii) deriving either a longitudinal MFD(z) data or a relative MFD data from the OTDR backscatter traces, at a single OTDR wavelength $\lambda_1$; and
   (iii) calculating estimated longitudinal dispersion D(z) of the fiber from either said longitudinal MFD(z) data or said relative MFD data derived from the OTDR backscatter traces generated by the time generated by an optical time domain reflectometer, at the wavelength $\lambda_1$, without utilizing any other wavelength data.

2. The method for measuring longitudinal variation in chromatic dispersion in an optical fiber according to claim 1, wherein said step of calculating estimated longitudinal dispersion D(z) from the longitudinal MFD(z) data or said relative MFD data is performed by utilizing a polynomial mapping function.

3. The method for measuring longitudinal variation in chromatic dispersion in an optical fiber according to claim 2, wherein the step of calculating longitudinal dispersion D(z) from said longitudinal MFD(z) data further includes the steps of:
   measuring end-to end dispersion of the optical fiber at the wavelength $\lambda_1$;
   calculating the bias for the optical fiber utilizing said end-to end dispersion measurement; and
   calculating adjusted longitudinal dispersion values D(z) (ps/nm/km) using said bias.

4. The method for measuring longitudinal variation in chromatic dispersion in an optical fiber according to claim 3, said method further comprising the step: of producing a rolling average over a specified number n of longitudinal dispersion values to reduce data variability.

5. The method for measuring longitudinal variation in chromatic dispersion in an optical fiber according to claim 1, wherein said step of calculating estimated longitudinal dispersion D(z) from the longitudinal MFD(z) data or said relative MFD data is performed by utilizing a conversion table that relates dispersion values to the corresponding MFD values.

6. The method for measuring longitudinal variation in chromatic dispersion in an optical fiber according to claim 1, wherein said step of calculating estimated longitudinal dispersion D(z) from relative MFD(z) data is performed by:
   (a) obtaining end-to end single wavelength dispersion measurement of the optical fiber (ps/nm);
   (b) solving the following equation to determine dispersion $D_0$ by utilizing the measured value of end-to dispersion obtained in step (a)

$$\int_0^L D(D_0, \Delta\tau(z))dz = \text{Total Dispersion;}$$

(c) obtaining numerically the MFD value corresponding to this dispersion value $D_0$ for the optical fiber with a given refractive index profile, this dispersion value being $MFD_0$;
   (d) building a map between the dispersion D and relative MFD and determining from this map chromatic dispersion D as a function of relative MFD; and
   (e) obtaining longitudinal chromatic dispersion values D(z) from the measured relative mode field diameter values by substituting these measured relative mode field diameter values into the chromatic dispersion function D.

7. The method for measuring longitudinal variation in chromatic dispersion in an optical fiber according to claim 1, further comprising the step of:
   obtaining variation of dispersion $\Delta D(z)$ as a function of the length of fiber.

8. The method for measuring longitudinal variation in chromatic dispersion in an optical fiber according to claim 7, wherein said variation of dispersion $\Delta D(z)$ is compared to a predetermined allowed dispersion variation variation within the allowed $\Delta D$ range (Dmax and Dmin) to screen fiber for dispersion variability.

9. A method for measuring longitudinal variation in chromatic dispersion in an optical fiber, comprising:
   (i) launching into a first end and a second end of optical fiber a first optical signal at the wavelength $\lambda_1$ to collect back-scatter power measurements P(z) for different positions z within said optical fiber;
   (ii) generating OTDR back-scatter traces from said back-scatter power measurements; by utilising an optical time domain reflectometer;
   (iii) deriving bi-directional OTDR(z) trace values I(z) from said OTDR traces,
   (iv) deriving longitudinal MFD(z) data at a single OTDR wavelength $\lambda_1$ from said bi-directional OTDR trace values; and
   (v) calculating estimated longitudinal dispersion D(z) of the optical fiber at the single OTDR wavelength $\lambda_1$, without utilizing any other wavelength data, from the longitudinal MFD(z) data by mapping dispersion values to the MFD values.

10. The method according to claim 9 wherein said mapping utilizes a conversion table.

11. The method according to claim 9 wherein said mapping utilizes a polynomial mapping function.

* * * * *